(12) United States Patent
Lee et al.

(10) Patent No.: US 7,620,657 B2
(45) Date of Patent: Nov. 17, 2009

(54) METHOD AND SYSTEM FOR REGISTERING AND RETRIEVING PRODUCTION INFORMATION

(75) Inventors: Jung Eun Lee, Seoul (KR); Hyun Joon Yoon, Seoul (KR); Jin Ho Jung, Kyunggi-do (KR); Joo Myung Jeong, Kyunggi-do (KR)

(73) Assignee: Yahoo! Inc., Sunnyvale, CA (US)

( * ) Notice: Subject to any disclaimer, the term of this patent is extended or adjusted under 35 U.S.C. 154(b) by 277 days.

(21) Appl. No.: 11/693,268

(22) Filed: Mar. 29, 2007

(65) Prior Publication Data

US 2008/0201368 A1     Aug. 21, 2008

(30) Foreign Application Priority Data

Feb. 20, 2007    (KR) ...................... 10-2007-0017019

(51) Int. Cl.
*G06F 17/30* (2006.01)
(52) U.S. Cl. .......................... 707/104.1; 707/10; 705/10
(58) Field of Classification Search ................. 707/3–5, 707/10, 100, 104.1; 709/203; 705/10
See application file for complete search history.

(56) References Cited

U.S. PATENT DOCUMENTS 7,007,076 B1 * 2/2006 Hess et al. ................. 709/219

| | | | |
|---|---|---|---|
| 2002/0091612 A1 * | 7/2002 | Greene et al. ................. 705/37 |
| 2002/0116280 A1 * | 8/2002 | Boies et al. ................... 705/26 |
| 2007/0067297 A1 * | 3/2007 | Kublickis ....................... 707/9 |
| 2007/0078726 A1 * | 4/2007 | MacDonald Korth et al. . 705/26 |

* cited by examiner

*Primary Examiner*—Cheryl Lewis
(74) *Attorney, Agent, or Firm*—Baker Botts L.L.P.

(57) ABSTRACT

In particular embodiments, an online trading system receives a product registration request including product description from a user terminal. Then, image information is extracted from the product description and a resource locator of the image information is generated. Then, an image list is generated based on the product description and the resource locator of the image information. The image list is sent to a search service DB server, where the image list is associated with a keyword relevant to the product description. Further, the image list may be sent to a UCC DB server. In this case, the UCC DB server generates a UCC containing the image list and sends a resource locator of the UCC to the search service DB server, which associates the resource locator of the UCC with a keyword relevant to the product description. If the search service server receives a search query including a keyword from a user terminal, the search service server searches a search service database to retrieve an image list or a resource locator of UCC containing an image list relevant to the keyword.

15 Claims, 7 Drawing Sheets

| Field | Semantics | Example |
|---|---|---|
| Event | <event:$event> | <event:insert> |
| Registration Number | <articleid:$imgid> | <articleid:45aef3b64ca9> |
| Title | <title:$title> | <title:Ultra-Slim DMB Cell Phone> |
| Descriptive Text | <text:$ImgComment> | <text:RAZR, Used (less than 1 month)> |
| Folder-name | <foldername:> | <foldername:Motorola> |
| Category | <catstr1:$si_categ1> | <catstr1:Cellular Phone> |
| Sub-Category | <catstr2:$si_categ2> | <catstr2:DMB Cellular Phone> |
| Property Code | <property:03> | <property:03> |
| Timestamp | <lastmod:$regdate_us> | <lastmod:1163092366> |
| Image File Size | <imgbytes:$imgbytes> | <imgbytes:236014> |
| Image URL | <objecturl:$imgurl> | <objecturl:http://kr.img.image.yahoo.com/ygi/gallery/img/ca/e3/45aef3b64ca9.jpg?45ae449b> |
| Image Size | <imagegeometry:$imagegeometry> | <imagegeometry:857638> |
| Thumbnail URL | <thumbnailurl:$thumburl> | <thumbnailurl:http://kr.img.image.yahoo.com/ygi/gallery/thumb/ca/e3/45aef3b64ca9.jpg?45ae449b> |
| Thumbnail Image Size | <thumimagegeometry:$thumimagegeometry> | <thumimagegeometry:25b> |
| Thumbnail File Size | <refererurl:$imgurl> | <refererurl:> |
| Webpage URL | <referclickurl:$hurl> | <referclickurl:http://kr.image.yahoo.com/GALLERY/read.html?img_filename=45aef3b64ca9> |
| Domain Name | <siteurl:kr.image.yahoo.com> | <siteurl:kr.image.yahoo.com> |
| User ID | <id:$userid> | <id:npapa> |
| Date of Subscription | <regweek:> | <regweek:> |
| Visitor Count | <cr:$visit_count> | <cr:2> |
| Reply Count | <memocnt:$reply_count> | <memocnt:0> |
| Adult Content Flag | <adult:0> | <adult:0> |
| Name Tag | <info:#b> | <info:#b> |
| Price | <price:$price> | <price:25000> |

FIGURE 2

METHOD AND SYSTEM FOR REGISTERING AND RETRIEVING PRODUCTION INFORMATION

TECHNICAL FIELD

The present disclosure generally relates to enabling the product information of an electronic commerce site to be searched using a search engine.

BACKGROUND

Since the proliferation of the internet in the mid-90s the information provided therein has drastically grown in quantity and quality. Along with such growth, the popularity of search engines as a means to efficiently navigate through this sea of information has also risen. The search engines, which is an online database system operated by search service providers such as Yahoo, collect enormous amounts of information from numerous resource locators such as web pages and classify many directories according to their subjects, so as to lead users to desired information through hypertext techniques.

Meanwhile, the internet has evolved from a simple resource sharing and file transferring medium to an interactive business medium, bringing electronic commerce, or e-commerce as it is commonly known, to its new culmination. Nowadays, various products are not only provided to online consumers by the sites run by volume retailers, but also by individuals or small retailers through various online trading or marketplace sites, such as Auction and eBay. Such small retailers post the information on the product they desire to sell on the marketplace sites and wait for a consumer to respond. The product information may include text data, such as the product name and description, and image data, such as the image file containing the picture of the product. In order to post the product information, the product information is registered on a database (DB) server run by one of the marketplace service providers. The consumer has to visit the website operated by the above marketplace service provider to know of the product on sale by the retailers. However, just displaying the product information on the marketplace website may not provide enough product exposure to lure and land the best deal with the consumer.

As explained above, the search engines provide powerful tool in retrieving the desired information from the internet the search service provider maintains a search service DB server, which contains resource locators such as URLs (Universal Resource Locators) and shorthand information on the information to be retrieved. However, the conventional search service providers do not maintain commercial information, such as the information on the products on sale at the search service DB server. Hence, the consumer cannot approach the product information using the conventional search engines. Some small retailers set up personal blog sites, image boxes or other UCC (User Created Contents) sites with the product information and its URL, so that the product information may be searched by the consumer using the search engine. However, setting up UCC sites for the sole purpose of advertising the product on sale is not only costly and cumbersome to the retailers but also may be a waste of valuable internet resources. Therefore, there is needed a method and apparatus for automatically enabling the product information registered at a marketplace website to searched by a search engine.

SUMMARY

The present invention provides a method and apparatus for effectively providing product information on a product on sale on a marketplace site through search services provided by portal sites, in particular embodiments, an online trading system receives a product registration request including product description from a user terminal. Then, image information is extracted from the product description and a resource locator of the image information is generated. Then, an image list is generated based on the product description and the resource locator of the image information. The image list is sent to a search service DB server, where the image list is associated with a keyword relevant to the product description. Further, the image list may be sent to a UCC DB server. In this case, the UCC DB server generates a UCC containing the image list and sends a resource locator of the UCC to the search service DB server, which associates the resource locator of the UCC with a keyword relevant to the product description. If the search service server receives a search query including a keyword from a user terminal, the search service server searches a search service database to retrieve an image list or a resource locator of UCC containing an image list relevant to the keyword.

BRIEF DESCRIPTION OF THE DRAWINGS

FIG. 2 illustrates an image list according to one embodiment of the present invention.

DESCRIPTION OF EXAMPLE EMBODIMENTS

In the following, various embodiments of the present invention will be described in detail with reference to the accompanying drawings. It will be apparent, however, that these embodiments may be practiced without some or all of these specific details, in other instances, well known process steps or elements have not been described in detail in order not to unnecessarily obscure the description of the invention.

Figure 1:
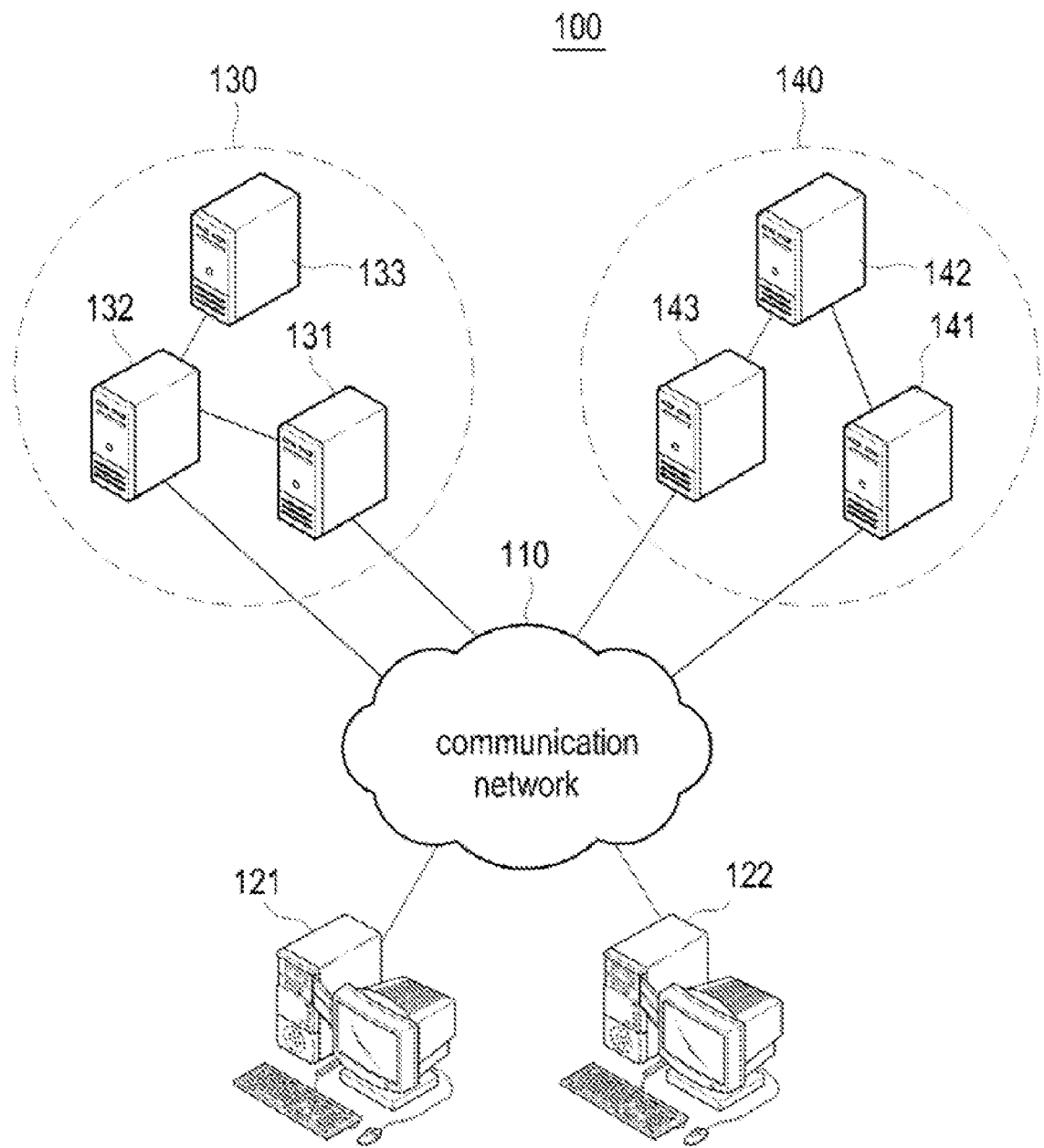
FIG. 1 illustrates a schematic diagram of an online trading system according to one embodiment of the present invention.

FIG. 1 illustrates a schematic diagram of an online trading system according to one embodiment of the present invention. Referring to FIG. 1, online trading system 100 includes communication network 110 such as an internet, a plurality of user terminals (UT) 121 and 122 connected to communication network 110, marketplace system 130 providing online trading service to user terminals 121 and 122 through communication network 110 and resource search system 140 providing resource search service to user terminals 121 and 122 through communication network 110. User terminals 121 and 122 may be personal computers, mobile phones or any other terminals with appropriate communication means to provide access to online services, such as online trading service provided by marketplace system 130 and resource search service provided by resource search system 140, to its users. Although only two terminals 121 and 122 is illustrated in FIG. 1 for ease of explanation, it should be noted that more than two terminals may be connected to communication network 110 to access marketplace system 130 and resource search system 140.

For example, a first user may log on to marketplace system 130 through first user terminal 121 and communication network 110 to register information on a product the first user desires to sell. Further, the first user may log on to marketplace system 130 to update or delete/register the registered product information. After the first user logs on to marketplace system 130, first user terminal 121 may receive from marketplace system 130 user interface data for displaying a product description input screen with a plurality of predetermined input items for inputting product description on the product the first user desires to sell. The product description may be texts, images, or any other type of multimedia data representing the product such as a product name, product images, product features, and price.

In particular, first user terminal 121 may provide a product description input screen with input items, such as text-input boxes, checkboxes and pull-down menus etc, on the product description, such as title, descriptive text, name tag, image file(s), category and sub-category of the product, folder-name, an adult content flag and price. The title may be a text that is to be used as the title of a webpage of marketplace system 130, the webpage displaying information on the product the first user desires to sell. The descriptive text may be a text that is to be used as the text content of the webpage. The descriptive text may contain a detailed technical specification, such as size, manufacturer, manufacturing date, price, etc., or any other information on the product. The name tag may be summary information on the product. The image file may contain a picture of the product. Not just one but a plurality of image files may be used. The category and the sub-category may be a number of predefined product types provided by marketplace system 130, one of which the first user can select through the product description input screen. For example, the first user may select 'mobile phone' and 'DMB (Digital Mobile Broadcast) mobile phone' as the category and sub-category of the product among the number of product types shown in the product description input screen. The folder-name may be a product classification for the product on sale defined by the first user. The adult content flag may be used to indicate whether the product can be sold to minors. The price may be used to indicate the product on sale.

The product the first user desires to sell may be a new product that is not registered on marketplace system 130. If the product is a new product that is not registered on marketplace system 130, the product description input screen may be void of any data on the product the first user desires to sell and the first user may input any product description data that the deems necessary through the input items provided by the product description input screen. Alternatively, the product the user desires to sell may be a registered product that was registered by the first user during a previous login session and the product description input screen may display data on the product most recently updated by the first user, which may have been sent from marketplace system 130 to first user terminal 121 when the first user logged on to marketplace system 130. The data on the registered product may include a product registration number, which has been assigned to the product by marketplace system 130 at the time of its registration and sent to first user terminal 121 when the first user logs in to marketplace system 130 to identify the registered product. The first user may input new product description on the product through the input items provided by the product description input screen to replace the displayed data on the product. Once the first user finishes inputting the (new) product description, the first user may click on items such as a 'register/update' button provided on the screen to send the inputted product description to the marketplace system 130. When the 'register/update' button is clicked by the first user, first user terminal 121 may generate a product registration/update request including the product description inputted by the first user and may send the generated request to marketplace system 130. If the product the first user desires to sell is already registered on marketplace system 130, the product registration/update request may contain the registration number of the product for identification purposes.

Further, the first user may also input a deregistration request for the product already registered on marketplace system 130 through the product description input screen for the registered product. The deregistration request may contain a registration number of the product to be deregistered, which has been assigned to the product by marketplace system 130 at the time of its registration and sent to first user terminal 121 when the first user logs in to marketplace system 130 to identify the registered product. The first user may click an items such as a 'deregister' button provided on the screen, and first user terminal 121 may generate and send a product deregistration request, which contains the registration number of the registered product for identification, to marketplace system 130.

The product registration/update request and the product deregistration request may be of an HTTP (Hyper Text Transfer Protocol) format. First user terminal 121 sends the product registration request or the product deregistration request to marketplace system 130 through communication network 110. The product registration/update request and the product deregistration request may further include a search enable flag, which indicates whether the first user desires to enable the product description to be searched by resource search system 140. In one example, first user terminal 121 may set the search enable flag according to the user input.

In one embodiment, marketplace system 130 includes marketplace server 131 for providing online trading service to user terminals 121, 122, marketplace database (DB) server 132 for generating, storing and deleting an image list (based on product description) and a list of resource locators to image file(s), and image file DB server 133 for storing the image file(s).

Marketplace server 131 may receive a product registration/update request or a product deregistration request from a user terminal such as first user terminal 121 and forward them to marketplace DB server 132, Marketplace DB server 132 receives the product registration/update request or a product deregistration request, which contain product description, a registration number and/or a search enable flag if marketplace DB server 132 receives the product registration/update request, marketplace DB server 132 extracts image file(s) contained in the received product description, sends the image file(s) to image file DB server 133 for its storage, and generates a resource locator of the extracted image file(s) (i.e. the resource locator of the image file(s) stored in image file DB server 133). Also, marketplace DB server 132 generates and stores thereto an image list based on the received product description and the generated resource locator, and assigns a new registration number to the image list, thereby registering the product on marketplace system 130. Once the product is registered on marketplace system 130, users connected to communication network 110 may view the information on the registered product and perform online trading of the registered product through a user interface (e.g., a webpage) showing information on the registered product provided by marketplace server 131. The image list is a predefined data structure based on the product description and the resource locator of the image file(s) that has been designed to provide optimal search results to users looking for the product through resource search system 140. The details on the image list will be explained below. If the product registration/update request contains a registration number, marketplace DB server 132 searches the pre-stored image list having the identical registration number and replaces the pre-stored generated image list with the newly generated image list, thereby updating information on the product on marketplace system 130. If marketplace DB server 132 receives the product deregistration request containing a registration number, marketplace DB server 132 searches and deletes the image list having the identical registration number and sends a request to delete the image file(s) related with the deleted image list to image DB server 133, thereby deregistering the product on marketplace system 130.

After registering, updating or deregistering the product, marketplace DB server 132 may check the search enable flag contained in the received product registration/update request or product deregistration request. In the case of the product, registration/update request, if the search enable flag is set to "ON," marketplace DB server 132 sets up a secure connection with resource search system 140 and transmits thereto the image list, in the case of the product deregistration request, if the search enable flag is set to "ON," marketplace DB server generates an image list which contains the registration number of the image list to be deregistered and sends the image list to resource search system 140 through a secure connection, so that resource search system 140 may delete the image list with the identical registration number. In one embodiment, the image list may be transmitted directly from marketplace DB server 132 to search service DB server 143 in resource search system 140. In another embodiment, marketplace DB server 132 may periodically transmit the image list to search service DB server 143 in batch processes for update purposes. The update may be done in an incremental fashion. That is, marketplace DB server 132 may transmit the image list only when the image list has been updated after the last transmission. This will save computing and network resources of marketplace system 130. The image list may be transmitted using a secure protocol, such as a SFTP (Secure File Transfer Protocol).

The image list is a predefined data structure based on the product description and the resource locator of the image file(s) that includes information on a product that is on sale on marketplace system 130. The image list may include data items to provide optimal search results to users looking for the product through resource search system 140. Further, the image list may include instructions to resource search system 140 to manage the image list stored in resource search system 140. The image list may be of a structure that has been predetermined between the owners, operators, or the like of marketplace system 130 and resource search system 140. One embodiment of the image list is shown in FIG. 2. Referring to FIG. 2, the image list may contain one or more of the following fields.

1. Event

The event field indicates actions to be performed by the recipient of the image list. The event field may contain 'insert' or 'delete,' as shown in FIG. 2. The 'insert' indicates that the corresponding image list is to be used for registration or update purposes. The 'delete' indicates that the corresponding image list is to be used for deregistration purpose.

2. Registration Number and Timestamp

The registration number field indicates a unique registration number assigned by marketplace DB server 132 for each registered product. The registration number is used to identify to which product the corresponding image list pertains. The timestamp field indicates the time the image list was created or the last time the image list was updated.

3. Title, Text, Name Tag

Each of the above fields contains the title, the descriptive text and the name tag included in the received production description, respectively.

4. Category, Sub-Category and Folder-Name

Each of the above fields contains the category, the sub-category and the folder-name contained in the received production description, respectively.

5. Adult Content Flag

The above field indicates whether the contents contained in the received product description can be exposed to minors.

6. User ID and the Date of Subscription.

The user ID field contains a user ID of a user who inputs the product description in marketplace system 130. The user logs into marketplace system 130 using the user ID. The date of subscription indicates the date the user subscribed to marketplace system 130 by the user ID indicated in the user ID field.

7. Webpage URL

The Webpage URL field indicates the universal resource locator of a webpage provided by marketplace system 130 for selling the product of the corresponding image list.

8. Visitor Count and Reply Count

The visitor count field indicates the number of visitors that have visited the webpage on the product on sale provided by marketplace system 130. The Reply field indicates the number of replies or comments made by the visitors visiting the webpage on the product on sale provided by marketplace system 130.

9. Image File URL, Image Size and Image File Size

The image file URL field contains the universal resource locator of image file(s) of the product (e.g. the resource locator of image file DB server 133). The image size field indicates the size of the image or picture contained in the image file(s) (e.g. 850×638). The image file size indicates the size of an image file(s) (e.g. 4 Megabytes).

10. Thumbnail URL, Thumbnail Size and Thumbnail File Size

Marketplace DB server 132 image file DB server 133 or any other arbitrary processing and storage means may generate and store therein thumbnail image file(s) of the image file(s) transmitted by a user. Each of the thumbnail URL, thumbnail size and thumbnail file size field indicates the universal resource locator, the image size and the file size of such thumbnail files.

11. Property Code

The property code is a unique identification code assigned to marketplace system 130 by resource search system 140. This code is used to identify in which system the corresponding image list was created among a plurality of e-commerce systems that transmits image lists to resource search system 140.

12. Price

The price field indicates the price of the product on sale.

In one embodiment, resource search system 140 includes search service server 141 for providing a search service to user terminals such as user terminals 121 and 122, search service index server 142 for searching and retrieving information relevant to a search keyword received from the user terminals through search service server 141, and search service DB server 143 for storing information that is to be searched and retrieved by search service index server 142.

As explained above, search service DB server 143 may receive from marketplace DB server 132 an image list of a product on sale at marketplace system 130. Search service DB server 142 refers to the 'event' field of the received image list. If the 'event' field contains an 'insert' instruction, search service DB server 143 refers to the 'registration number' field of the received image list and determines whether an image list with a registration number identical to the registration number in the received image list is stored in search service DB server 142. If an image list with a registration number identical to the registration number in the received image list is not found in search service DB server 142, search service DB server 132 stores therein the received image list. If an image list with a registration number identical to the registration number in the received image list is found in search service DB server 142, search service DB server 142 overwrites the stored image list with the received image list. In this case, search service DB server 143 may inform search service index server 142 that a new image list of a product has been received, such that search index server 142 performs indexing of keywords relevant to the image list. Any suitable keyword indexing algorithms may be employed in indexing keywords relevant to the image list. If the 'event' field contains a 'delete' instruction, search service DB server 142 searches therein a pre-stored image list with a registration number identical to the registration number indicated in the 'registration number' field of the received image list and deletes the searched image list. Search service DB server 143 may periodically update image lists of products stored therein with newly received image lists from marketplace DB server 132.

For example, if search service server 141 receives a search query including a keyword which is related to a certain product from a user terminal such as second user terminal 122 through communication network 110, search service server 141 forwards the keyword to search service index server 142. Search service index server 142 then searches information stored in search service DB server 143 and returns to search service server 141 with information relevant to the received keyword, which may include information relevant to the product including an image list received from marketplace DB server 132. Search service server 141 receives the information relevant to the keyword and generates a response containing the information with the image list, which includes the resource locator of a resource (e.g., a web page) for the product provided by marketplace system 130. The user terminal such as second user terminal 122 receives the response containing the image list and displays it, e.g., using a web browser program running thereon. For example, a user of the user terminal may click the resource locator of the image list included in the response, and may find more detail information of the product on sale to perform online trading of the product. The resource locator of the product description may be displayed on the user terminal using indicia of the product, e.g., a thumbnail image of the product.

The image list contains many predefined data items describing the product on sale that facilitates accurate and efficient search operation of search service index server 142. When providing search results to search service server 141, search service index server 142 not only provides the resources relevant to the inputted keyword but also provides the order of those resources in the search result. The resources with greater relevancy are given higher rank in the search result. Search service index server 142 may employ any one of (1) title, text and name Tag, (2) category, sub-category and folder-name, (3) adult content flag, (4) user ID and the date of subscription, (5) visitor count and reply count and (6) property code and other items in the image list stored in search service DB server 143 to provide an accurate match to the search query.

The second user can use a keyword combination of various keywords to further narrow the scope of the search result. For example, if a keyword combination of "cellular phone" and "visitor count" and "e-Bay" is received from second user terminal 122, search service index server 142 may refer to the image lists stored in search service DB server 143, e.g., one or more of (2) category, sub-category and folder-name, (5) visitor count, and (6) property code in the image lists, to provide a search result. Since the image list contains various data items adapted for product search operation, search index server 142 returns with a search result that satisfies the second user's need. Search index server 142 may be adapted to the data structure of the image list to efficiently search through the stored image lists.

Figure 3:
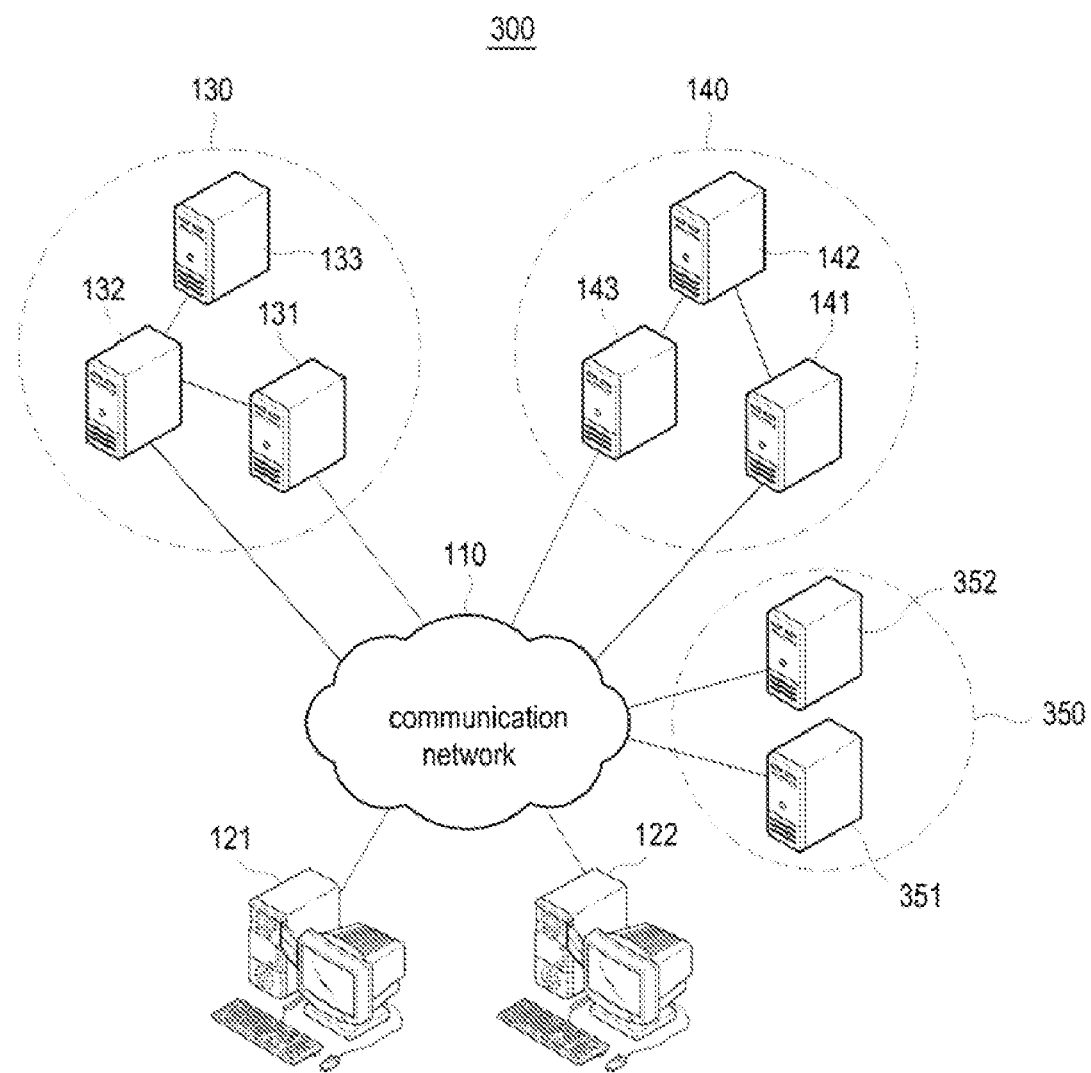
FIG. 3 illustrates a schematic diagram of an online trading system according to another embodiment of the present invention.

FIG. 3 illustrates a schematic diagram of an online trading system according to another embodiment of the present invention. Online trading system 300 in FIG. 3 has a similar configuration to online trading system 100 shown in FIG. 1. Thus, each component of online trading system 300, having substantially the same function as the counterpart shown in FIG. 1, is identified by the same reference numeral and the description thereof will be omitted herein. Further, the features different from online trading system 100 of FIG. 1 will be explained in detail in the ensuing descriptions.

Referring to FIG. 3, online trading system 300 further includes UCC (User Created Contents) service system 350. For example, marketplace server 131 may receive a product registration request from a user terminal such as first user terminal 121 and forwards it to marketplace DB server 132. Marketplace DB server 132 receives the product registration request from marketplace server 131, extracts the product description and the search enable flag from the product registration request, extracts image file(s) from the product description, sends the image file(s) to image file DB server 133 and generates a resource locator of the extracted image file(s) (i.e. the resource locators of image file DB server 133). Marketplace DB server 132 generates and stores an image list based on the received product description and the generated resource locator and assigns a new registration number to the image list, thereby registering the product information on marketplace system 130.

After registering the product, marketplace DB server 132 may check the search enable flag contained in the received product information. If the search flag is set to "ON," marketplace DB server 132 sets up a secure connection with at least one of UCC service system 350 and resource search system 140, and transmits thereto the image list described with reference to FIG. 1. In one embodiment, the image list of the product may be transmitted directly from marketplace DB server 132 to resource search system 140 or UCC service system 350. In another embodiment, marketplace DB server 132 may periodically transmit image lists of products to resource search system 140 or UCC service system 350 in batch processes for update purposes. Image lists of products may be transmitted using a secure protocol, such as a SFTP (Secure File Transfer Protocol).

UCC service system 350 stores UCC (User-Created Contents) such as images and videos generated by users and transmitted, for example, by user terminals 121 and 122. In one embodiment. UCC service system 350 includes UCC server 351 and UCC DB server 352. UCC server 351 receives UCC access requests from user terminals such as user terminals 121 and 122 and transmits responses thereto. Specifically, the user terminals may gain access to UCC stored in UCC DB server 352 through UCC server 351 by transmitting UCC access requests (e.g., in HTTP format). UCC server 351 retrieves the requested UCC from UCC DB server 352 and reformats them into an appropriate form such as an HTTP format. Then, UCC server 351 sends the user terminals responses containing the retrieved UCC.

As explained above, UCC DB server 352 may receive from marketplace DB server 132 and stores therein the image list of the product as needed or periodically, e.g., through a secure connection such as SFTP. UCC DB server 352 then generates UCC based on or containing the image list and stores the generated UCC therein. Also, depending on the value of the search enable flag, UCC DB server 352 may transmit the generated UCC (or a resource locator of the UCC) to search service DB server 143.

For instance, when users perform search using a keyword related to the image list or product description through resource search system 140, resource search system 140 returns to the users with a search result that contains at least one of the image list of the product and the resource locator of the UCC that contains the product description. Thus, the online trading system according to this embodiment provides additional exposure to the product description, by providing users with UCC containing relevant product descriptions in response to the users' search query.

In the following, some components of an online trading system according to particular embodiments will be explained in more detail with reference to FIGS. 4 and 5. Although some other components thereof are not described in detail any components including servers and databases suitable for implementing online marketplace system or search system in the field of the present invention may be applied thereto.

Figure 4:
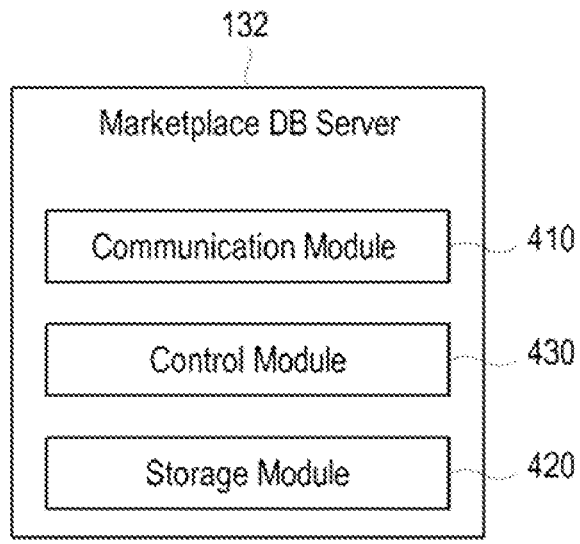
FIG. 4 illustrates a block diagram of the marketplace DB server according to one embodiment of the present invention.

FIG. 4 illustrates a detailed block diagram of the marketplace DB server according to one embodiment of the present invention. Referring to FIG. 4, marketplace DB server 132 includes communication module 410 for communicating with marketplace server 131, image file DB server 133 and other network entities connected to marketplace server 131 or communication network 110, storage module 420 for storing image list and control module 430 for controlling the overall operation, especially storage and communication of the product information, of market place DB server 132.

Control module 430 may receives a product registration/update request from marketplace server 131. When control module 430 receives the product registration/update request, control module 430 extracts product description and a search enable flag contained in the product registration/update request, extracts image file(s) from the product description, and forwards the image file(s) to image file DB server 133. Also, control module 430 generates a resource locator of the image file(s). The product description may contain texts, images, or any other type of multimedia representing the product information. Control Module 430 generates an image list based on the received product description and the generated resource locator. Control module 430 determines whether the product registration/update request contains a registration number. If the product registration/update request does not contain a registration number, control module 430 stores the generated image list in storage module 420. If the product registration/update request does contain a registration number, control module 430 searches an image list with an identical registration number stored in storage module 420 and overwrites the searched image list with the generated image list. Control module 430 then checks a search enable flag contained in the received product registration/update request. If the search enable flag is set to "ON," control module 430 sets up a secure connection with marketplace DB server 132 and transmits the generated image list through communication module 410. The image list may be transmitted using a secure protocol, such as a SFTP. In addition, the control module 430 may set up another secure connection with UCC DB server 352 and transmit the image list through communication module 410.

Also, control module 430 may receives a product deregistration request from marketplace server 131. When control module receives the product deregistration request, control module 430 extracts a registration number and a search enable flag contained in the product deregistration request. Control module 430 searches an image list with an identical registration number stored in storage module 420 and deletes the searched image list. Control module 430 then checks a search enable flag contained in the received product deregistration request, if the search enable flag is set to "ON." control module 430 generates an image list containing a 'delete' instruction and the registration number, sets up a secure connection with marketplace DB server 132 and transmits the generated image list through communication module 410. The image list may be transmitted using a secure protocol, such as a SFTP. In addition, the control module 430 may set up another secure connection with UCC DB server 352 and transmit the image list through communication module 410.

Figure 5:
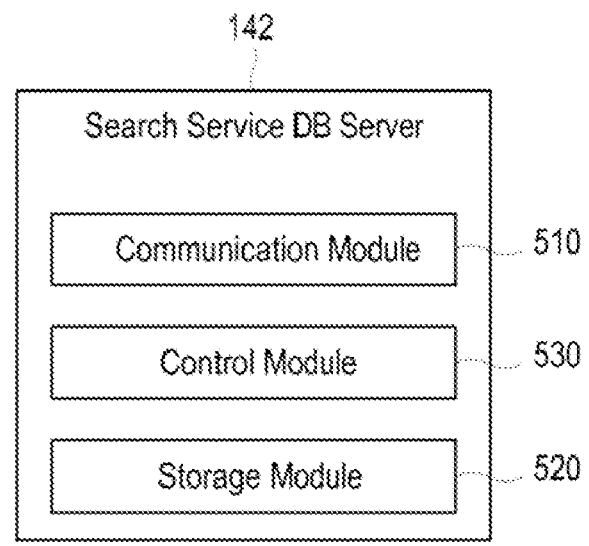
FIG. 5 illustrates a block diagram of the search service DB server according to one embodiment of the present invention.

FIG. 5 illustrates a block diagram of the search service DB server according to one embodiment of the present invention. Referring to FIG. 5, search service DB server 143 includes communication module 510 for communicating with search service server 141, search service index server 142 and other network entities connected to search service server 141, or communication network 110, storage module 520 for storing information that is to be searched and retrieved by search service index server 142, and control module 530 for controlling the overall operation, especially storage and communication of the product information, of search service DB server 143.

In one embodiment, storage module simply stores the information. In another embodiment, storage module 520 stores a database of resources that is indexed based on search keywords. Storage module 520 may employ any suitable keyword indexing and resource crawling algorithms to construct the database of resources. Further, storage module 520 may store a database of image lists or resource locators, e.g., an image list or a resource locators of UCC containing the image lists as described above, which is indexed based on search keywords. Alternatively, storage module 520 may simply store image lists or resource locators without indexing.

Control module 530 may receive an image list of a product from marketplace DB server 132 or UCC DB server 352 to store/update the received image list of the product or the resource locator of UCC in the storage module 520. Such process of storing/updating the image lists or resource locators may be performed in real time upon receiving the image lists or the resource locators from marketplace DB server 132 or UCC DB server 352. Alternatively, the process of storing/updating the image lists or the resource locators may be performed periodically in batch processes.

In one embodiment, when a search query including a keyword relevant to a certain product is received from search service index server 142 through communication module 510, control module 530 searches storage module 520 to retrieve the image list of the product or a resource locator of UCC containing the image list. Control module 530 transmits the retrieved image list or the retrieved resource locator to search service index server 142 through communication module 510.

Figure 6:
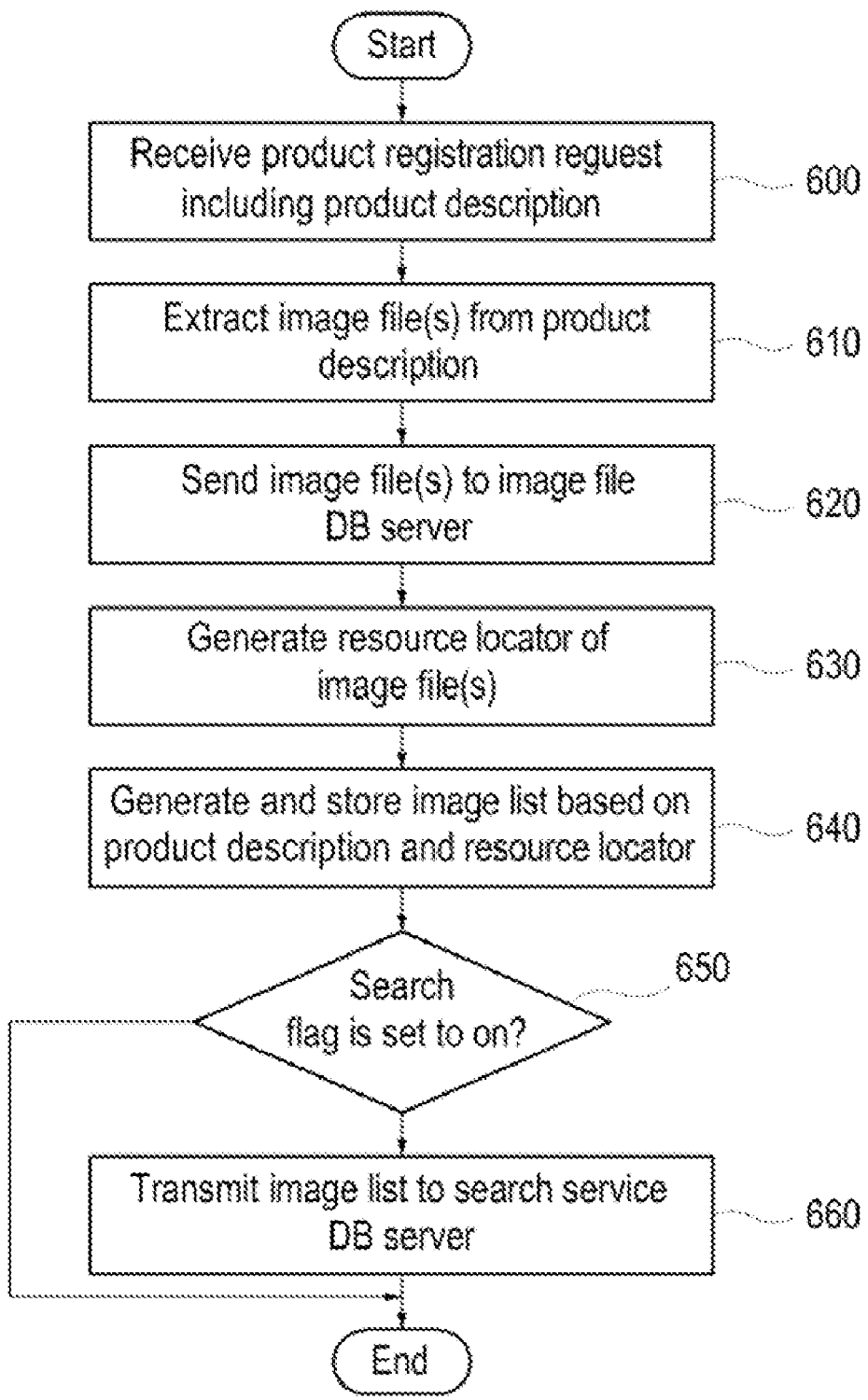
FIG. 6 illustrates a flow chart for registering product information according to one embodiment of the present invention.

FIG. 6 illustrates a flow chart for registering product information according to one embodiment of the present invention. Referring to FIG. 6, a marketplace DB server such as marketplace DB server 132 (FIGS. 1, 3 and 4) receives a product registration request, which includes product description, from a marketplace server such as marketplace server 131 (operation 600). For example, the product description may be texts, images, or any other type of multimedia data representing product information such as a product name, product images, product features, and price. The product registration request may be a request generated at the marketplace server in response to a product registration request from a user terminal such as first user terminal 121 (FIGS. 1 and 3). In operation 610, the marketplace DB server extracts image file(s) from the product description and sends the extracted image file(s) to an image file DB server, such as image file DB server 133 (FIGS. 1 and 2), so that the image file DB server may store and register the image file(s) (operation 620). In operation 630, the marketplace DB server generates a resource locator of the image file(s). The resource locator may be a resource locator to an image file DB server such as image file DB server 133. In operation 640, the marketplace DB server generates and stores therein an image list based on the product description and the generated resource locator.

In operation 650, the marketplace DB server determines whether a search enable flag contained in the product registration request is set to 'ON.' If the search enable flag is set to 'ON,' the marketplace DB server transmits the image list to a search service DB server such as search service DB server 143 (FIGS. 1, 3 and 5) or a UCC DB server such as UCC DB server 352 (FIG. 3) (operation 660).

In one embodiment, the resource locator of the product description may be transmitted directly from the marketplace DB server to the search service DB server or the UCC DB server. In another embodiment the marketplace DB server may periodically transmit resource locators of product descriptions to the search service DB server or the UCC DB server in batch processes for update purposes. Resource locators of product descriptions may be transmitted using a secure protocol, such as a SFTP. The UCC DB server then generates UCC containing the product description (or the resource locator of the product description) and stores the generated UCC therein. Also, depending on the value of the search enable flag, the UCC DB server may transmit the generated UCC (or a resource locator of the UCC) to the search service DB server.

Although not illustrated in FIG. 6, upon receiving an image list or the resource locator of the UCC DB server from the marketplace DB server or the UCC DB server, the search service DB server may store therein the image list or the resource locator, in this case, the search service DB server may inform a search service index server such as search service index server 142 (FIGS. 1 and 3) that the image list or the resource locator of the UCC has been received, such that the search index server performs indexing of keywords relevant to the product description. Any suitable keyword indexing algorithms may be employed in indexing keywords relevant to the product description.

Figure 7:
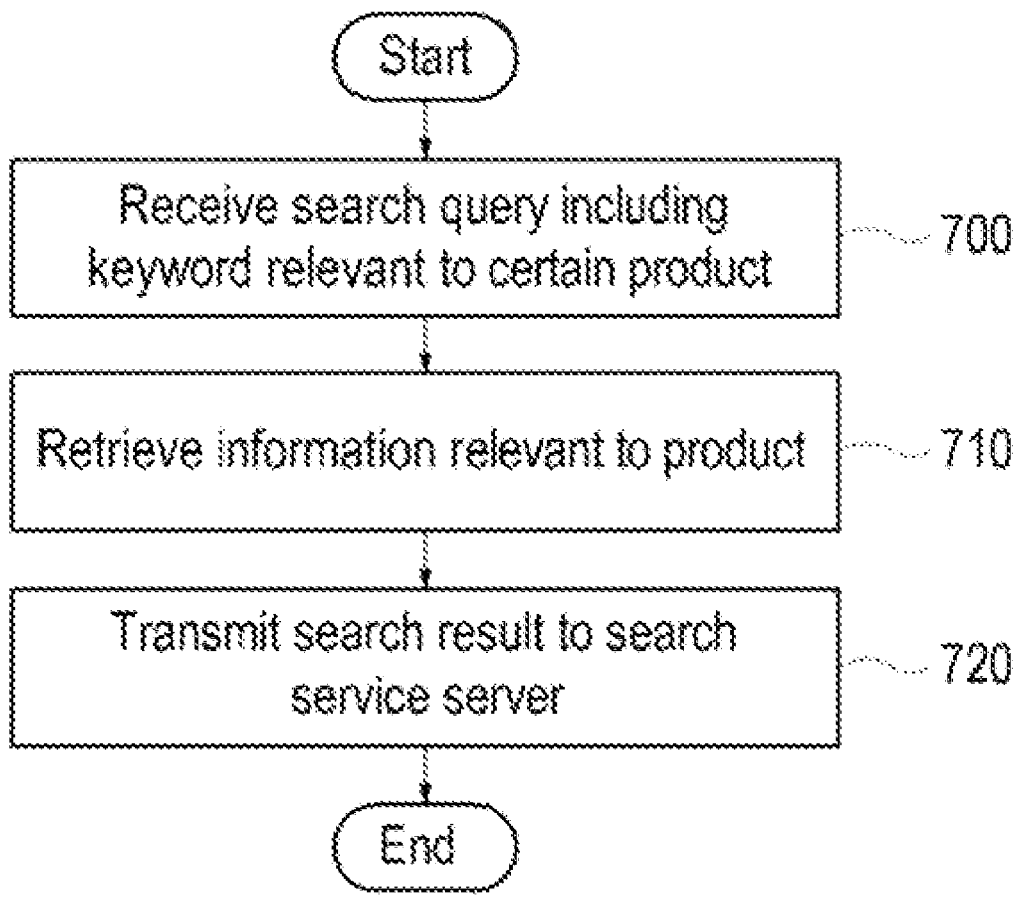
FIG. 7 illustrates a flow chart for retrieving product information according to one embodiment of the present invention.

FIG. 7 illustrates a flow chart for retrieving product information according to one embodiment of the present invention. Referring to FIG. 7, a search service index server such as search service index server 142 (FIGS. 1 and 3) receives a search query including a search keyword relevant to a certain product from a search service server such as search service server 141 (FIGS. 1 and 3) (operation 700). In operation 710, the search service index server searches information stored in a search service DB server such as search service DB server 143 (FIGS. 1 and 3) and returns information relevant to the received keyword, which may include information relevant to the product, i.e., an image list or a resource locator of UCC containing or based on the image list. As explained with reference to FIG. 1, the image list contains many predefined data items describing the product on sale that facilitates accurate and efficient search operation in the search service index server. When providing search results to the search service server, the search service index server not only provides the resources relevant to the inputted keyword but also provides the order of those resources in the search result. The resources with greater relevancy are given higher rank in the search result. In operation 720, the search service index server transmits the retrieved information to the search service server.

The search service server receives the information relevant to the keyword and generates a response containing the information with the resource locator of the product description or UCC containing the product description. The search service server sends the response to a user terminal, which then displays it, e.g., using a web browser program running thereon. For example, a user of the user terminal may click the resource locator of the product description or the UCC included in the response, and may find more detail information of the product on sale to perform online trading of the product. The resource locator of the image list may be displayed on the user terminal using indicia of the product, e.g., a thumbnail image of the product.

Figure 8:
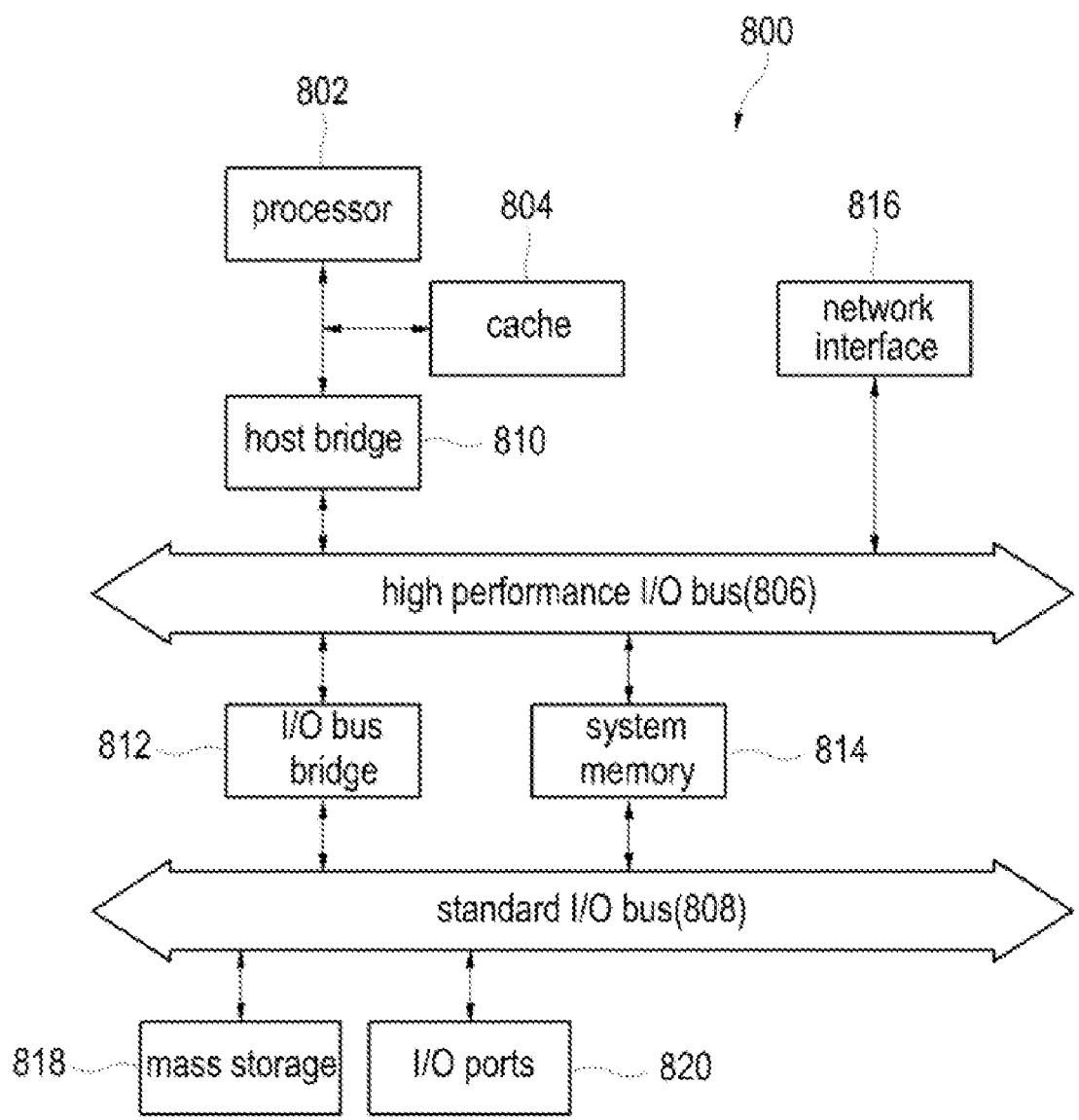
FIG. 8 illustrates an example computing system architecture, which may be used to implement embodiments of the present invention.

While the methods and systems of the present invention have been described above with reference to specific embodiments, some or all of the elements or operations thereof may be implemented using a computer system having a general purpose hardware architecture. FIG. 8 illustrates an example computing system architecture, which may be used to implement the above described embodiments, which may be used to perform one or more of the processes or elements described herein. In one implementation, hardware system 800 includes a processor 802, a cache memory 804, and one or more software applications and drivers directed to the functions described herein.

Additionally, hardware system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and a network/communication interface 816 couple to bus 806. Hardware system 800 may further include video memory (not shown) and a display device coupled to the video memory. Mass storage 818, and I/O ports 820 are couple to bus 808. Hardware system 800 may optionally include a keyboard and pointing device, and a display device (not shown) coupled to bus 808. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 800 are described in greater detail below. In particular, network interface 816 provides communication between hardware system 800 and any of a wide range of networks, such as an Ethernet (e.g., IEEE 802.3) network, etc. In the case of search service DB server 143 (FIGS. 1, 3 and 5), the network interface 816 interfaces between the hardware system 800 and the network connected to marketplace server 131 and image file DB server 133 for allowing the hardware system 800 to communicate with those servers. Similarly, in the case of search service DB server 143 (FIGS. 1, 3 and 6), the network interface 816 interfaces between the hardware system 800 and the network connected to search service server 141 and search service index server 142 for allowing the hardware system 800 to communicate with those servers. Mass storage 818 provides permanent storage for the data and programming instructions to perform the above described functions implemented in marketplace DB server 132 or search service DB server 143, whereas system memory 814 (e.g., DRAM) provides temporary storage for the data and programming instructions when executed by processor 802. I/O ports 820 are one or more serial and/or parallel communication ports that provide communication between additional peripheral devices, which may be coupled to hardware system 800.

Hardware system 800 may include a variety of system architectures; and various components of hardware system 800 may be rearranged. For example, cache 804 may be on-chip with processor 802. Alternatively, cache 804 and processor 802 may be packed together as a "processor module," with processor 802 being referred to as the "processor core." Furthermore, certain implementations of the present invention may not require nor include all of the above components. For example, the peripheral devices shown coupled to standard I/O bus 808 may couple to high performance I/O bus 806. In addition, in some implementations only a single bus may exist, with the components of hardware system 800 being coupled to the single bus. Furthermore, hardware system 800 may include additional components, such as additional processors, storage devices, or memories. As discussed below, in one embodiment, the operations of online trading system including 100 described herein are implemented as a series of software routines run by hardware system 800. These software routines comprise a plurality or series of instructions to be executed by a processor in a hardware system, such as processor 802. Initially, the series of instructions are stored on a storage device, such as mass storage 818. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 816. The instructions are copied from the storage device, such as mass storage 818, into memory 814 and then accessed and executed by processor 802.

An operating system manages and controls the operation of hardware system 800, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like.

According to certain embodiments of the present invention, a method and apparatus for effectively providing product description on a product on sale on a marketplace site through search services provided by portal sites are provided. Further, while the present invention has been shown and described with respect to a preferred embodiment, those skilled in the art will recognize that various changes and modifications may be made without departing from the spirit and scope of the invention as defined in the appended claims.

The invention claimed is:

1. A system comprising:
a marketplace server configured to receive, from a first user terminal, a product registration request including a product description, wherein the product description includes image information for a physical product;
a marketplace database server configured to extract the image information from the product description, transmit the extracted image information to an image file server for storage, generate an image list based on the product description and a resource locator of the transmitted image information stored within the image file server, and send the image list to a search service database server, the image list comprising one or more fields including one or more data items for use by the search service database server in providing search results, the image list further comprising one or more instructions to the search service database server to manage the image list,
wherein the marketplace database server sends the resource locator of the product description to a User Created Contents Database (UCC DB) server, and wherein the UCC DB server generates a User Created Contents (UCC) containing the image list and sends a resource locator of the UCC to the search service database server;
wherein the search service database server associates the image list with a keyword relevant to the product description, and wherein when the search service database server receives, from a second user terminal, a search query including the keyword, the search service database server searches a search service database to retrieve the image list.

2. The system of claim 1, wherein the image list includes at least one of an event instruction, a registration number of the image list, a timestamp of the image list, a title, a text, a name tag, a category and/or a sub-category of the product, a folder-name of the product, an adult content flag of the product, a user ID regarding the product, a date of subscription regarding the product, a resource locator of a webpage for the product provided by the online trading system, a visitor count of the webpage, a reply count of the webpage, the resource locator of the image file server, an image size of the image information, an image file size of the image information, a property code of the search service database server or a price of the product.

3. The system of claim 1, wherein the product registration request contains a search enable flag, and wherein the marketplace database server determines whether to send the image list to the search service database server based on the search enable flag.

4. The system of claim 1, wherein the search service database server associates the resource locator of the UCC containing the product description with a keyword relevant to the product description.

5. A system comprising:
a search service database server configured to receive, from an online trading system, an image list of a physical product, the image list comprising one or more fields including one or more data items for use by the search service database server in providing search results, the image list further comprising one or more instructions to the search service database server to manage the image list, wherein the search service database server associates a resource locator of a product description of the product with a keyword relevant to the image list, wherein the product description includes image information for the product;
a search service server configured to receive, from a user terminal, a search query including a keyword, wherein the search server searches the search service database server to retrieve a resource locator of a product description relevant to the keyword,
wherein the search service database server receives a resource locator of a User Created Contents (UCC) containing an image list from the online trading system, and associates the resource locator of the UCC with a keyword relevant to the image list, and wherein the search service server receives a search query including a keyword from a user terminal, and searches the search service database server to retrieve a resource locator of a UCC containing a product description relevant to the keyword.

6. The system of claim 5, wherein the image list includes at least one of an event instruction, a registration number of the image list, a timestamp of the image list, a title, a text, a name tag, a category and/or a sub-category of the product, a foldername of the product, an adult content flag of the product, a user ID regarding the product, a date of subscription regarding the product, a resource locator of a webpage for the product provided by the online trading system, a visitor count of the webpage, a reply count of the webpage, the resource locator of the image file server, an image size of the image information, an image file size of the image information, a property code of the search service database server or a price of the product.

7. A system comprising:
a marketplace server configured to receive, from a user terminal, a product registration request including a product description, wherein the product description includes image information for a physical product;
a marketplace database server configured to receive, from the marketplace server, product information including the product description, wherein the marketplace database server extracts image information of the product from the product description and generates an image list of the product description;
a search service database server configured to receive the image list of the product description from the marketplace database server, wherein the search service database server associates the image list of the product description with a keyword relevant to the product description, the image list comprising one or more fields including one or more data items for use by the search service database server in providing search results, the image list further comprising one or more instructions to the search service database server to manage the image list; and
a search service server configured to receive a search query including a keyword from a user terminal, wherein the search service server searches the search service database server to retrieve an image list of a product description relevant to the keyword,
wherein the marketplace database server sends the image list of the product description to a User Created Contents (UCC) database server, and wherein the UCC database server generates a UCC based on the image list and sends a resource locator of the UCC to the search service server.

8. The system of claim 7, wherein the image list includes at least one of an event instruction, a registration number of the image list, a timestamp of the image list, a title, a text, a name tag, a category and/or a sub-category of the product, a foldername of the product, an adult content flag of the product, a user ID regarding the product, a date of subscription regarding the product, a resource locator of a webpage for the product provided by the online trading system, a visitor count of the webpage, a reply count of the webpage, the resource locator of the image file server, an image size of the image information, an image file size of the image information, a property code of the search service database server or a price of the product.

9. The system of claim 7, wherein the product registration request contains a search enable flag, and wherein the marketplace database server determines whether to send the resource locator of the image list to the search service server based on the search enable flag.

10. The system of claim 7, wherein the search service server associates the resource locator of the UCC containing the product description with a keyword relevant to the product description.

11. The system of claim 7, wherein the search service database server receives a resource locator of a User Created Contents (UCC) based on an image list from the marketplace database server, and associates the resource locator of the UCC with a keyword relevant to the image list, and wherein the search service server receives a search query including a keyword from a user terminal, and searches the search service database server to retrieve a resource locator of a UCC based on the image list relevant to the keyword.

12. A method comprising:
receiving, from a user terminal, a search query including a keyword; and
searching a search service database to retrieve an image list relevant to the keyword, wherein the search service database includes a database of image lists of products associated with keywords relevant to the image list, each image list being based on a product description for a physical product, the product description including image information for the physical product, the image list comprising one or more fields including one or more data items for use in providing search results, the image list further comprising one or more instructions to manage the image list
wherein the search service database includes a database of resource locators of User Created Contents (UCC) containing image lists associated with keywords relevant to the image lists, further comprising:
searching the search service database to retrieve a resource locator of a UCC containing the image list relevant to the keyword.

13. The method of claim 12, wherein the image list includes at least one of an event instruction, a registration number of the image list, a timestamp of the image list, a title, a text, a name tag, a category and/or a sub-category of the product, a folder-name of the product, an adult content flag of the product, a user ID regarding the product, a date of subscription regarding the product, a resource locator of a webpage for the product provided by the online trading system, a visitor count of the webpage, a reply count of the webpage, the resource locator of the image file server, an image size of the image information, an image file size of the image information, a property code of the search service database server or a price of the product.

14. Logic encoded in one or more tangible media for execution and when executed operable to cause one or more processors to:
  receive, from a user terminal, a search query including a keyword; and
  search a search service database to retrieve an image list relevant to the keyword, wherein the search service database includes a database of image lists of products associated with keywords relevant to the image list, each image list being based on a product description for a physical product, the product description including image information for the physical product, the image list comprising one or more fields including one or more data items for use in providing search results, the image list further comprising one or more instructions to manage the image list;
  wherein the search service database includes a database of resource locators of User Created Contents (UCC) containing image lists associated with keywords relevant to the image lists and wherein the logic is further operable, when executed, to cause the one or more processors to:
  search the search service database to retrieve a resource locator of a UCC containing the image list relevant to the keyword.

15. The logic of claim 14, wherein the image list includes at least one of an event instruction, a registration number of the image list, a timestamp of the image list, a title, a text, a name tag, a category and/or a sub-category of the product, a folder-name of the product, an adult content flag of the product, a user ID regarding the product, a date of subscription regarding the product, a resource locator of a webpage for the product provided by the online trading system, a visitor count of the webpage, a reply count of the webpage, the resource locator of the image file server, an image size of the image information, an image file size of the image information, a property code of the search service database server or a price of the product.

* * * * *